Oct. 14, 1958

A. PINTO 2,856,572

ELEVATOR MOTOR CONTROL SYSTEM

Filed May 17, 1956

ANTHONY PINTO INVENTOR

BY [signature] ATTORNEY

United States Patent Office 2,856,572
Patented Oct. 14, 1958

2,856,572

ELEVATOR MOTOR CONTROL SYSTEM

Anthony Pinto, New Rochelle, N. Y., assignor to Otis Elevator Company, New York, N. Y., a corporation of New Jersey Application May 17, 1956, Serial No. 585,530

11 Claims. (Cl. 318—144)

The invention relates to control systems for elevators.

There are advantages, especially in elevator installations in which the car runs above a certain speed, in providing a direct current hoisting motor for the elevator car and supplying current thereto from a variable voltage direct current generator. One of these advantages resides in the nicety of control of acceleration and retardation. However, it is possible at times for car passengers to feel slight bumps in the car as the acceleration and retardation steps are made and as the transfer is made from the main to the leveling operation. Another advantage resides in the improved load compensation. The amount of load compensation desired varies, depending on whether the car is accelerating, running full speed or leveling. Here too, passengers may feel slight bumps as changes in load compensation are effected.

The object of the invention is to improve the smoothness of operation of the elevator car in a system in which a direct current hoisting motor is utilized, supplied with current at a variable voltage from a direct current generator.

The invention will be described as applied to a system in which the generator has both a separately excited field winding and a self-excited field winding. In operation, the polarity of the generator is determined in starting by the separately excited field winding. As the generator voltage builds up, the self-excited field winding gradually takes over the excitation. During retardation, the excitation provided by the self-excited field winding is decreased and finally the excitation is taken over by the separately excited field winding for the leveling or slow speed operation. The separately excited field winding is maintained connected for the entire operation, enabling a smooth transition from and to the separately excited field winding excitation to be made.

The invention involves the utilization of a saturable reactor for controlling the excitation of the generator. The self-excited field winding in series with the generator armature and the separately excited field winding are connected in parallel to the rectifier bridge to which the output windings of the saturable reactor are connected. This enables a single saturable reactor to be used for controlling both windings. The voltage applied to the self-excited field winding is that of the generator armature and that of the output of the saturable reactor in series. Thus the generator provides an increasing proportion of the excitation as the car comes up to full speed. The saturable reactor controls acceleration and slow speed operation and provides load compensation at all times.

The saturable reactor has three direct current windings, one a control winding, another a load compensation winding and the third a restraining winding. The building up of the flux in the reactor by the control winding is delayed for acceleration. Also the restraining winding acts to oppose the build-up of flux in the reactor with a gradually decreasing effect. Thus the build-up of the output voltage is controlled to provide the desired acceleration of the elevator car. The load compensation winding is connected to be subject to the current in the generator armature-motor armature loop circuit and so as to provide the proper polarity for compensation, for both directions of car travel. The load compensating winding is also controlled to provide the desired compensation for acceleration and retardation, slow speed operation and full speed operation.

Features and advantages of the invention will be seen from the above and from the following description and appended claims.

In the drawings:

Figure 1s is a key diagram showing in spindle form the relationship of the coils and contacts of the switches employed in Figure 1.

Figures 1, 2:
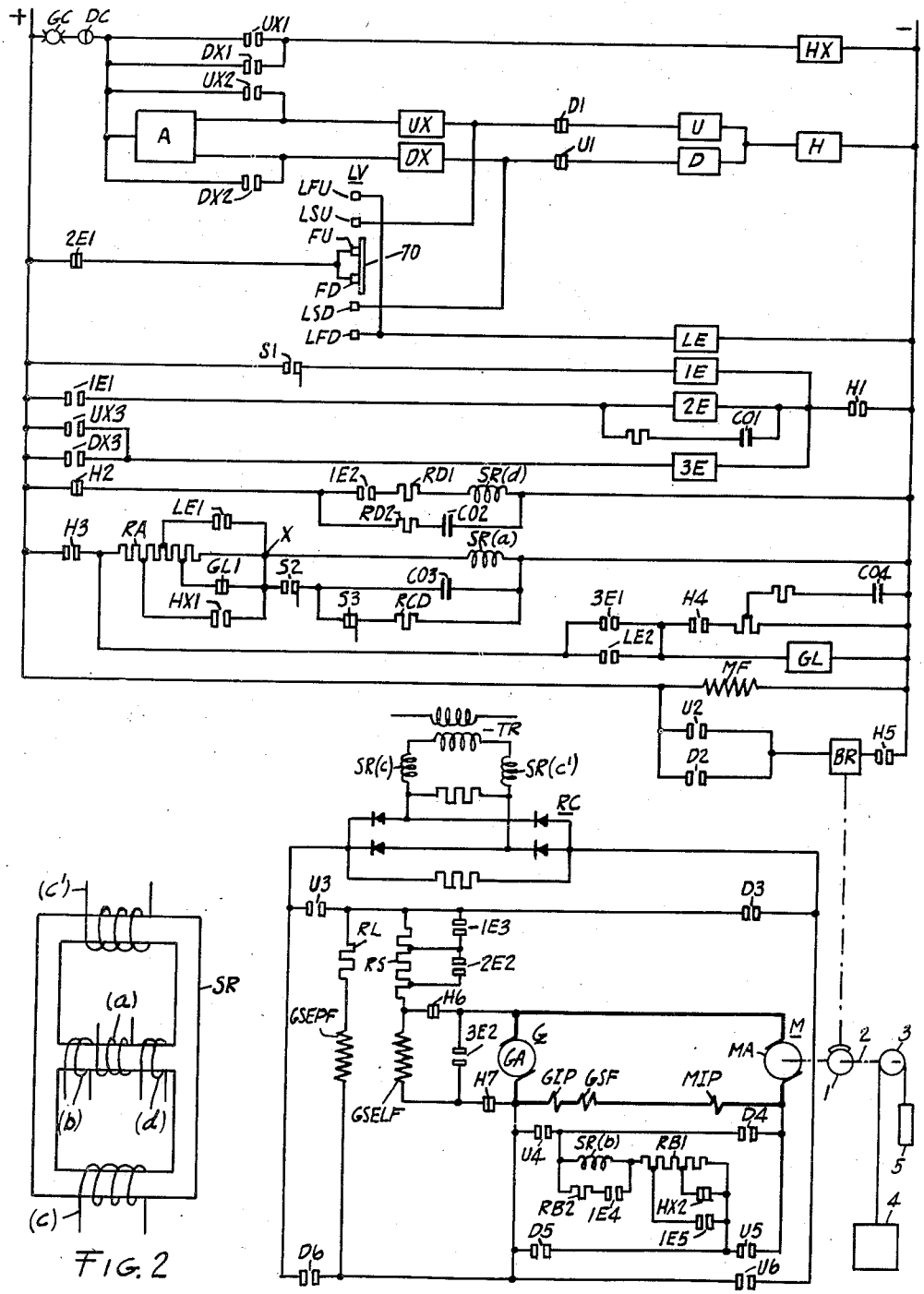
Figure 1 is an "across-the-line" wiring diagram of a simplified elevator control system embodying the invention.
Figure 2 is a diagrammatic representation of a saturable reactor utilized in the circuits of Figure 1.
Figure 15:
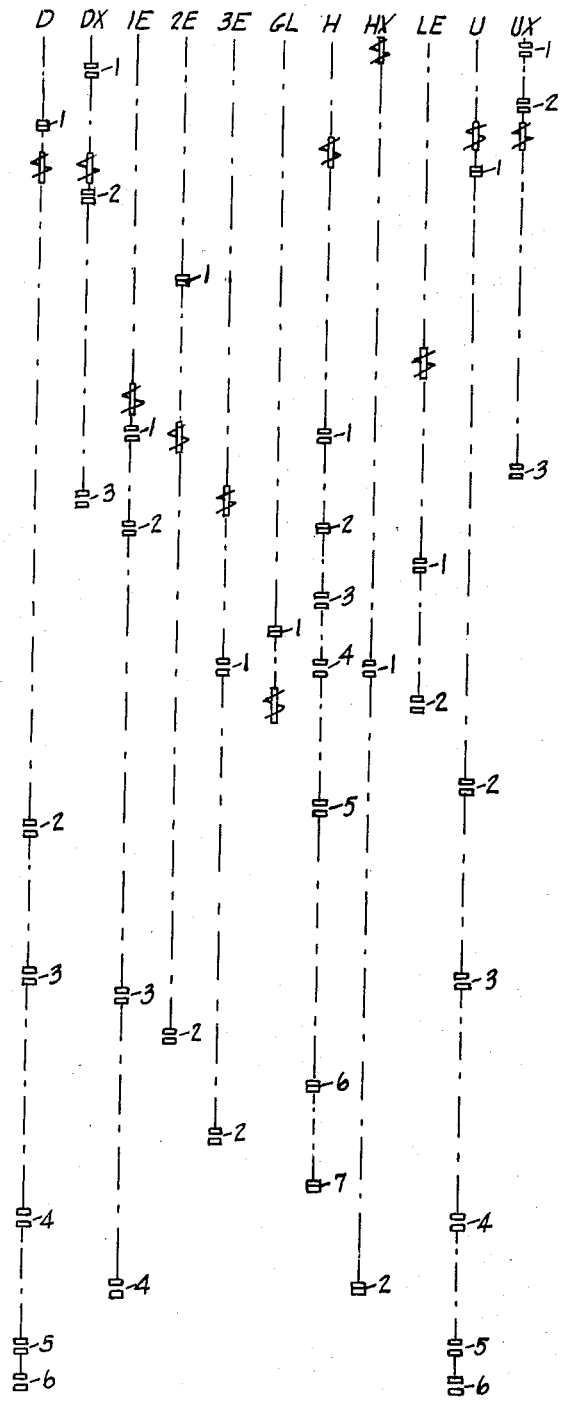

The circuits shown are in simple form, as elevator control systems are very complex. It is to be understood that, in applying the invention to complete elevator control systems, certain amplifications and alterations may be in order in adapting the invention to certain of these systems.

The electro-magnetic switches employed in the circuits illustrated are designated as follows:

U—Up direction switch
D—Down direction switch
UX—Auxiliary up direction switch
DX—Auxiliary down direction switch
H—Field and brake switch
HX—Auxiliary field and brake switch
1E, 2E, 3E—Speed control switches
LE—Leveling speed control switch
GL—Leveling return switch Numerals are appended to the contacts of the various switches to differentiate between them.

BR designates the release coil of the electro-mechanical brake. The brake shoes are applied to the brake drum 1 on the shaft 2 of the hoisting motor M which drives the sheave 3 for raising and lowering the elevator car 4 and counterweight 5. The hoisting motor armature is designated MA and its field winding MF. The hoisting motor is supplied with current at variable voltage by the generator G, the generator armature GA and hoisting motor armature MA being connected in a loop circuit. The generator separately excited field winding is designated GSEPF, and its self-excited field winding is designated GSELF. The generator is also provided with a series field winding GSF and an interpole field winding GIP. The elevator hoisting motor also has an interpole field winding designated MIP. Resistance RL is for adjusting the strength of generator separately excited field winding GSEPF. Resistance RS is for controlling the excitation of generator self-excited field winding GSELF. GC represents the contacts of the elevator car door. DC represents the hoistway door lock contacts in series relationship.

The saturable reactor is designated generally as SR. It has two output windings designated SR(c) and SR(c') which have alternating voltage applied thereto from the secondary winding of transformer TR. These windings are connected in a bridge rectifier circuit RC to supply current to the field windings GSEPF and GSELF of the generator. The impedance of the output windings and thus the current supplied by the reactor to the generator field windings is controlled through saturation of the core effected by magnetomotive force under the control of direct current windings. Three direct current control windings are provided for the saturable reactor, winding SR(a) serving as an excitation control winding, winding SR(b) serving as a load compensating winding, and winding SR(d) serving as a restraining winding. Resistance RA is for controlling the excitation of winding SR(a), resistances RB1 and RB2 are for controlling the excitation of winding SR(b), and resistances RD1 and RD2 are for controlling the excitation of winding SR(d).

The invention is applicable to systems in which the starting of the car is under the control of an attendant, to those in which the passengers themselves control the starting of the car, and to those in which the cars are started automatically. Inasmuch as the control circuits vary materially in each different type of system, the circuits for controlling the starting of the car have been indicated by a block designated A. It is to be understood that switch mechanisms in block A complete the circuit for the coils of the direction switches and field and brake switch in starting the car and open the circuits incident to the stopping operation.

It will be assumed that stops are effected automatically by mechanism actuated by car movement. This may be in the form of a selector such as is illustrated in patent to D. C. Larson, No. 2,611,451, granted September 23, 1952. This form of selector provides leveling mechanism in the form of a plurality of rotating cams 70, one for each floor, which are contacted on their face by contact fingers. In the wiring diagram, this leveling mechanism is designated LV the contact fingers being illustrated as stationary contacts and designated LFU, LSU, FU, FD, LSD, and LFD, and the cams as a rectangle, also designated 70. Contacts S1, S2 and S3 are contacts which are operated in starting of the car and initiating slow-down. Contacts S1 and S2 are closed in starting the car and opened after a call has been picked up by the selector in the aforesaid Larson patent, and contacts S3 are opened in starting and closed when a call is picked up.

In starting the car in the up direction for example, a circuit is completed by the switching mechanism in block A for the coils of auxiliary up direction switch UX, up direction switch U, and field and brake switch H, the circuit extending through car door contacts GC, hoistway door lock contacts DC and interlock contacts D1. Switch UX engages contacts UX2 to establish a holding circuit around block A. Switch U separates interlock contacts U1. Switch H separates contacts H6 and H7 to disconnect generator self-excited field winding GSELF from across generator armature GA. Switch H also engages contacts H1 to complete a circuit for the coil of speed control switch 1E through contacts S1, now closed. Also, along with contacts UX3, contacts H1 complete a circuit for the coil of speed control switch 3E. Switch 3E operates, engaging contacts 3E2 to connect generator self-excited field winding GSELF in series with generator armature GA in a circuit in parallel with generator separately excited field winding GSEPF. Switch U also engages contacts U3 and U6 to connect generator separately excited field winding GSEPF, and also generator self-excited field winding GSELF in series with generator armature GA, across the terminals of the rectifier bridge RC. Switches U and H also engage contacts U2 and H5, respectively, to complete a circuit for the release coil of electromechanical brake BR. This releases the brake and as the generator field windings GSEPF and GSELF are excited, the car is started in the up direction. Generator separately excited field winding GSEPF provides the proper generator excitation for up direction of car travel. The rectifier bridge RC insures the proper polarity of excitation of the generator by generator self-excited field winding GSELF.

Switch 1E, upon operation, engages contacts 1E3 to short-circuit a step of resistance RS in circuit with generator self-excited field winding GSELF. It also engages contacts 1E1 to complete a circuit for the coil of speed control switch 2E. Switch 2E upon operation separates contacts 2E1 to render the leveling mechanism LV ineffective to control the operation of up direction switch U and field and brake switch H. It also engages contacts 2E2 to short-circuit another step of resistance RS in the circuit for generator self-excited field winding GSELF. These operations take place substantially simultaneously with the completion of the field winding circuits and the generator voltage is increased by self excitation to bring the car up to full speed.

When a call is picked up, contacts S1 open to break the circuit for the coil of switch 1E. This switch separates contacts 1E3 to reinsert a step of resistance RS in circuit with generator self-excited field winding GSELF. This increases the slope of the resistance line of the self-excited field winding circuit to slow down the car. It also separates contacts 1E1 to break the circuit for the coil of switch 2E. Switch 2E is delayed in dropping out by the discharge of condenser CO1. Upon dropping out, switch 2E separates contacts 2E2 to insert the remainder of resistance RS in circuit with the generator self-excited field winding GSELF, further increasing the slope of the resistance line to further slow down the car. At the same time it engages contacts 2E1 in the circuit to feed contacts FU, FD of leveling mechanism LV.

As the car arrives at a certain distance from the landing at which the stop is being made, cam 70 for that landing bridges contacts LFU, LSU and FU. The bridging of contacts LSU and FU short-circuits the coil of switch UX, causing this switch to drop out. Also, this maintains the circuit for the coils of switches U and H after the separation of contacts UX2 and of the initial energizing contacts in block A. Switch UX, upon dropping out, also separates contacts UX1 to deenergize the coil of auxiliary field and brake switch HX. Also, contacts UX3 separate to break the circuit for the coil of speed control switch 3E. Switch 3E, upon dropping out, separates contacts 3E2 to disconnect the generator self-excited field winding GSELF. Also, the bridging of contacts LFU and FU completes a circuit for the coil of leveling speed control switch LE.

As the car arrives at the landing, cam 70 disengages stationary contacts LFU and LSU in sequence to cause the car to be further slowed down, as will be explained later, and finally to break the circuits for the coils of switches U and H. Switches U and H drop out to separate contacts U2, U3, U6 and H5 to disconnect the generator separately excited field winding GSEPF from rectifier bridge RC and to disconnect the brake release coil BR from the supply lines, causing the car to be brought to a stop. At the same time contacts H6 and H7 reengage to connect the generator self-excited field winding GSELF across the generator armature with a polarity to oppose the residual flux of the generator.

The car is started in the down direction by causing operation of switches DX and D instead of switches UX and U. Slow-down and stopping of the car is effected in a similar manner, cam 70 coperating with stationary contacts LFD, LSD and FD instead of contacts LFU, LSU and FU.

Smooth operation during acceleration and retardation as well as during full speed running is obtained by saturable reactor SR. In starting the car, control winding SR(a) is connected to the supply lines by the engagement of contacts H3. Also contacts HX1 short-circuit a portion of resistance RA to give the desired amount of excitation of this winding. Contacts S2 are closed in starting so that the engagement of contacts H3 also connects condenser CO3 to the supply lines, the connection of both the coil and condenser being through a portion of resistor RA. At this instant, since the condenser is not charged, the potential at point X is substantially that of the − supply line. As the charging of the condenser is delayed by a portion of resistance RA, this delays the rise in potential of point X and thus the building up of the flux in the reactor by winding SR(a). Also in starting, contacts H2 separate to disconnect condenser CO2 from the supply lines. As contacts 1E2 engage at the same time, condenser CO2 discharges into reactor restraining winding SR(d). Winding SR(d) acts to oppose winding SR(a) and thus the build-up of the flux in the reactor. This opposing action is greatest at the start, gradually decreases as the motor accelerates, and reduces to zero as the motor comes up to full speed. This gives a very smooth control of acceleration of the elevator car.

During retardation, contacts 1E2 are open so that the restraining winding SR(d) is ineffective. When slow-down is initiated, contacts S2 open, disconnecting condenser CO3 from control winding SR(a) and contacts S3 close to connect resistance RCD across the condenser to effect discharge thereof. Slow-down is effected by the separation of contacts 1E3 and 2E2 as above described. As the car arrives in the fast speed leveling zone, switch HX is dropped out and switch LE is operated as previously described. As a result, contacts HX1 separate and contacts LE1 engage to increase the amount of resistance RA in circuit with winding SR(a). This decreases the excitation of the reactor provided by winding SR(a) with the result that the car is further slowed down. As the car passes from the fast speed leveling zone into the slow speed leveling zone, the disengagement of cam 70 from contact LFU (or LFD) causes the dropping out of switch LE. This results in the separation of contacts LE1 to further increase the amount of resistance RA in circuit with winding SR(a). This decreases the excitation of the reactor in an amount to bring the car down to slow leveling speed. Thereafter, as cam 70 disengages contact LSU (or LSD), switches U and H are dropped out to bring the car to a stop as above described. At the same time, contacts H3 separate to disconnect winding SR(a) from the supply lines.

Should the car in stopping overrun the floor, the leveling mechanism acts to control the direction switch and switch H to cause the car to return to the landing level. Should the overrun extend into the fast speed zone, contacts LE1 engage to cause operation at fast leveling speed. Should the overrun extend only into the slow speed leveling zone, contacts GL1 of the leveling return switch cause sufficient energization of the generator to insure the return of the car to the landing. As the car comes into the landing on an underrun, the coil of switch GL is connected to the supply lines, first by contacts 3E1 and then contacts LE2, by way of contacts H3. Also condenser CO4 is charged by way of contacts H4. Upon separation of contacts LE2 as the car moves into the slow speed zone, the coil of switch GL is disconnected from the supply lines. The switch is maintained operated however by the discharge of condenser CO4. As the car arrives at the landing, contacts H4 separate to break the condenser discharge circuit and the switch drops out. Thus contacts GL1 are engaged if the car overruns into the slow speed zone to short circuit a portion of resistance RA.

As the starting of the car is initiated, the direction switch, say switch U, engages contacts U4 and U5 to connect the reactor load compensating winding SR(b) across the generator series field winding GSF and interpole winding GIP and the hoisting motor interpole field winding MIP. The polarity of excitation is such that winding SR(b) supports winding SR(a) when the car is traveling up with positive load. Inasmuch as the excitation of winding SR(a) is not reversed for down travel of the car, and as the current in the generator armature-motor armature loop circuit is reversed, the circuit for compensating winding SR(b) is reversed by means of contacts D4 and D5 for down car travel so as to cause this winding to support winding SR(a) for positive load in the down direction. The circuit for winding SR(b) is through resistance RB1. In starting, contacts 1E5 engage to short-circuit a portion of said resistance. Also contacts 1E4 engage to connect resistance RB2 across the load compensation coil SR(b). Resistance RB2 by-passes current around the load compensation winding during the rapid change thereof during acceleration. This together with the action of contacts 1E5 provides the desired excitation of the load compensation winding during acceleration. At the initiation of slow-down, contacts 1E4 separate to disconnect resistance RB2. Also contacts 1E5 separate to increase the amount of resistance RB1 in circuit with winding SR(b) for retardation of the motor. As the car comes into the leveling zone, contacts HX2 engage to short circuit a portion of resistance RB1 to strengthen the action of the load compensation winding for the slow speed operation.

This arrangement provides smooth compensation for all load conditions and for acceleration, retardation, full speed operation and leveling.

When the generator is first excited in the starting of the car, the shunt excitation is furnished mainly by the separately excited field winding GSEPF. As the generator voltage builds up, the self-excited field winding gradually takes over. When the car enters the leveling zone, the excitation provided by the self-excited field winding has been reduced to a low value and is disconnected and the separately excited field winding provides the shunt excitation. Owing to the connections of the two field windings GSEPF, GSELF, the excitation of both is controlled by the single saturable reactor SR. Furthermore, the transition from one winding to the other winding is made with such other winding already excited so that a smooth transition is made. Door opening takes place in the leveling zone and owing to the fact that switch 3E disconnects the self-excited field winding at the time the leveling mechanism takes over, a speed above leveling speed during door opening and possible passenger transfer is obviated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination; a direct current elevator hoisting motor; a direct current generator for supplying current at a variable voltage to said motor, said generator having a field winding; a direct current source; an alternating current source; unidirectional current conducting means arranged in bridge relationship; a saturable reactor having output windings supplied with current from said alternating current source and connected to the input of said bridge, said reactor also having a direct current control winding; starting control means for said motor; means responsive to operation of said starting control means to start said motor for connecting said field winding to the output of said bridge and for connecting said control winding to said direct current source; and a condenser connected in parallel with said control winding to said direct current source for delaying the build-up of flux in said reactor by said control winding to control the acceleration of said motor.

2. In combination; a direct current elevator hoisting motor; a direct current generator for supplying current at a variable voltage to said motor, said generator having a field winding; a direct current source; an alternating current source; unidirectional current conducting means arranged in bridge relationship; a saturable reactor having output windings supplied with current from said alternating current source and connected to the input of said bridge, said reactor also having a direct current control winding and a direct current restraining winding; a condenser connected to said direct current source; starting control means for said motor; and means responsive to operation of said starting control means to start said motor for connecting said field winding to the output of said bridge, for connecting said control winding to said direct current source and for disconnecting said condenser from said direct current source and connecting it across said restraining winding, said restraining winding due to the discharge of said condenser acting to oppose the build-up of flux in said reactor by said control winding in a gradually decreasing amount to control the acceleration of said motor.

3. In combination; a direct current elevator hoisting motor; a direct current generator for supplying current at a variable voltage to said motor, said generator having a field winding; a direct current source; an alternating current source; unidirectional current conducting means arranged in bridge relationship; a saturable reactor having output windings supplied with current from said alternating current source and connected to the input of said bridge, said reactor also having a direct current control winding and a direct current restraining winding; a condenser connected to said direct current source; starting control means for said motor; means responsive to operation of said starting control means to start said motor for connecting said field winding to the output of said bridge, for connecting said control winding to said direct current source and for disconnecting said condenser from said direct current source and connecting it across said restraining winding; and a second condenser connected in parallel with said control winding for delaying the build-up of flux in said reactor by said control winding upon connection thereof to said direct current source, said restraining winding due to the discharge of said condenser acting to assist in delaying the build-up of flux in said reactor by opposing in a gradually decreasing amount the action of said control winding to control the acceleration of said motor.

4. In combination; a direct current elevator hoisting motor; a direct current generator for supplying current at a variable voltage to said motor, said generator having an armature, a separately excited field winding and a self-excited field winding; a unidirectional current source; starting control means for said motor; and means responsive to operation of said starting control means to start said motor for connecting said self-excited field winding in series with said generator armature and said separately excited field winding in parallel therewith to said source for acceleration of said motor, said separately excited field winding remaining connected to said source while the motor runs; stopping control means for said motor; and means responsive to operation of said stopping control means for disconnecting said self-excited field winding and generator armature from said source for slow speed operation of said motor.

5. In combination; a direct current elevator hoisting motor; a direct current generator for supplying current at a variable voltage to said motor, said generator having an armature, a separately excited field winding and a self-excited field winding; an alternating current source; unidirectional current conducting means arranged in bridge relationship; a saturable reactor having output windings supplied with current from said alternating current source and connected to the input of said bridge, said reactor also having a direct current control winding; starting control means for said motor; and means responsive to operation of said starting control means to start said motor for connecting said self-excited field winding in series with said generator armature across the output of said bridge and said separately excited field winding in parallel with said self-excited field winding and generator armature across the output of said bridge, said reactor acting to control the excitation of said field windings for acceleration of said motor, said separately excited field winding providing the initial excitation of the generator and the self-excited field winding taking over the excitation of the generator as the generator comes up to speed.

6. In combination; a direct current elevator hoisting motor; a direct current generator for supplying current at a variable voltage to said motor, said generator having an armature, a separately excited field winding and a self-excited field winding; a direct current source; an alternating current source; unidirectional current conducting means arranged in bridge relationship; a saturable reactor having output windings supplied with current from said alternating current source and connected to the input of said bridge, said reactor also having a direct current control winding; starting control means for said motor; means responsive to operation of said starting control means to start said motor for connecting said self-excited field winding in series with said generator armature across the output of said bridge and said separately excited field winding in parallel therewith across the output of said bridge and for connecting said control winding to said direct current source, said reactor acting to control the excitation of said field windings for acceleration of said motor, said separately excited field winding providing the initial excitation of the generator and the self-excited field winding taking over the excitation of the generator as the generator comes up to speed, said separately excited field winding remaining connected to said source while the motor runs; stopping control means for said motor; means responsive to operation of said stopping control means for disconnecting said self-excited field winding and generator armature from said bridge for slow speed operation of said motor; means for delaying the build-up of flux in said reactor by said control winding in starting said motor; and means for reducing the excitation provided by said control winding for slow speed operation of said motor in stopping.

7. In combination; a direct current elevator hoisting motor; a direct current generator for supplying current at a variable voltage to said motor, said generator having an armature, a separately excited field winding and a self-excited field winding; resistance connected in series with said self-excited field winding; a direct current source; an alternating current source; unidirectional current conducting means arranged in bridge relationship; a saturable reactor having output windings supplied with current from said alternating current source and connected to the input of said bridge, said reactor also having a direct current control winding and a restraining winding; starting control means for said motor; means responsive to operation of said starting control means to start said motor for connecting said self-excited field winding in series with said generator armature across the output of said bridge with said resistance cut out, for connecting said separately excited field winding in parallel therewith across the output of said bridge and for connecting said control winding to said direct current source; means including said restraining winding for delaying the build-up of flux in said reactor by said control winding for controlling the excitation of said field windings for acceleration of said motor; stopping control means for said motor; means responsive to operation of said stopping control means for inserting said resistance in circuit with said self-excited field winding to retard said motor and for disconnecting said self-excited field winding and generator armature from said bridge for slow speed operation of said motor; and means for reducing the excitation provided by said control winding for retarding said motor during said slow speed operation.

8. In combination; a direct current elevator hoisting motor having an armature; a direct current generator for supplying current at a variable voltage to said motor, said generator having an armature and a field winding; an alternating current source; unidirectional current conducting means arranged in bridge relationship; a saturable reactor having output windings supplied with current from said alternating current source and connected to the input of said bridge, said reactor also having a load compensation winding subject to the current in the motor armature-generator armature circuit during running of said motor; starting control means for connecting said field winding to the output of said bridge; means for by-passing current flow around said load compensation winding during acceleration of said motor; stopping control means for said motor for rendering said by-pass means ineffective for retardation and slow speed running of said motor, for decreasing the effectiveness of said load compensation winding for said retardation and for increasing the effectiveness of said load compensation winding for said slow speed running.

9. In combination; a direct current elevator hoisting motor having an armature; a direct current generator for supplying current at a variable voltage to said motor, said generator having an armature, a shunt field winding and a series field winding; an alternating current source; unidirectional current conducting means arranged in bridge relationship; a saturable reactor having output windings supplied with current from said alternating current source and connected to the input of said bridge, said reactor also having a load compensation winding; starting control means for said motor; means responsive to operation of said starting control means to start said motor for connecting said shunt field winding to the output of said bridge and for connecting said load compensation winding to be subject to the current flowing in the motor armature-generator armature circuit; means for by-passing current flow around said load compensation winding during acceleration of said motor; resistance connected in series with said load compensation winding; stopping control means for said motor for rendering said by-pass means ineffective for retardation and slow speed running of said motor, for increasing the amount of said resistance for said retardation and for decreasing the amount of said resistance for said slow speed running.

10. In combination; a direct current elevator hoisting motor having an armature; a direct current generator for supplying current at a variable voltage to said motor, said generator having an armature and a field winding; a direct current source; an alternating current source; unidirectional current conducting means arranged in bridge relationship; a saturable reactor having output windings supplied with current from said alternating current source and connected to the input of said bridge, said reactor also having a control winding and a load compensation winding; starting control means for said motor; means responsive to operation of said starting control means to start said motor for connecting said field winding across the output of said bridge, for connecting said control winding to said direct current source and for connecting said load compensation winding to be subject to the current flowing in the motor armature-generator armature circuit; resistance connected in parallel with said load compensation winding to by-pass current flow around said load compensation winding during the rapid change thereof during acceleration of said motor; a second resistance connected in series with said load compensation winding; stopping control means for said motor; and means responsive to operation of said stopping control means to initiate slowdown of said motor for disconnecting said by-pass resistance and increasing the amount of said second resistance and for decreasing the amount of said second resistance for slow speed operation of said motor.

11. In combination; a direct current elevator hoisting motor having an armature; a direct current generator for supplying current at a variable voltage to said motor, said generator having an armature and a series field winding connected in a loop circuit with said motor armature, a separately excited field winding and a self-excited field winding; a direct current source; an alternating current source; unidirectional current conducting means arranged in bridge relationship; a saturable reactor having output windings supplied with current from said alternating current source and connected to the input of said bridge, said reactor also having a direct current control winding, a direct current restraining winding and a direct current load compensation winding; starting control means for said motor; means responsive to operation of said starting control means to start said motor for connecting said self-excited field winding in series with said generator armature across the output of said bridge, for connecting said separately excited field winding in parallel therewith across the output of said bridge for connecting said control winding to said direct current source, and for connecting said load compensation winding to be subject to the current flowing in said loop circuit; means including said restraining winding for delaying the build-up of flux in said reactor by said control winding to control the excitation of said separate and self-excited field windings for acceleration of said motor; resistance connected in parallel with said load compensation winding to by-pass current flow around said load compensation winding during the rapid change thereof during acceleration; a second resistance connected in series with said load compensation winding; stopping control means for said motor; and means responsive to operation of said stopping control means for disconnecting said by-pass resistance and increasing the amount of said second resistance for retardation, and for disconnecting said self-excited field winding and generator armature from said bridge and for decreasing the amount of said second resistance for slow speed operation of said motor.

References Cited in the file of this patent

UNITED STATES PATENTS 2,643,741      Esselman _____ June 30, 1953